US008840372B2

(12) United States Patent
Girard

(10) Patent No.: US 8,840,372 B2
(45) Date of Patent: Sep. 23, 2014

(54) SET OF CYCLIC SWASHPLATES FOR CONTROLLING THE PITCH OF BLADES OF A MAIN ROTOR, AND A ROTOR PROVIDED WITH SUCH A SET

(75) Inventor: Vincent Girard, Venelles (FR)

(73) Assignee: Airbus Helicopters, Marignane Cedex (FR)

( * ) Notice: Subject to any disclaimer, the term of this patent is extended or adjusted under 35 U.S.C. 154(b) by 1008 days.

(21) Appl. No.: 12/908,073

(22) Filed: Oct. 20, 2010

(65) Prior Publication Data

US 2011/0097208 A1 Apr. 28, 2011

(30) Foreign Application Priority Data

Oct. 23, 2009 (FR) ...................................... 09 05111

(51) Int. Cl.
*B64C 27/605* (2006.01)
(52) U.S. Cl.
CPC .................................... *B64C 27/605* (2013.01)
USPC ....................... 416/114; 416/134 A; 416/141
(58) Field of Classification Search
CPC ...... B64C 27/065; B64C 11/06; B64C 11/30; B64C 11/32; B64C 11/36
USPC ................. 416/112–115, 134 A, 141, 170 R; 244/17.11, 17.25
See application file for complete search history.

(56) References Cited

U.S. PATENT DOCUMENTS

| 2,486,059 | A | * | 10/1949 | Pentecost ...................... 416/115 |
| 4,375,940 | A | * | 3/1983 | Lovera et al. ................. 416/114 |
| 5,067,875 | A | * | 11/1991 | Hunter et al. ................. 416/114 |
| 5,624,232 | A | * | 4/1997 | Certain ......................... 416/114 |

FOREIGN PATENT DOCUMENTS

| DE | 3620794 A1 | * | 12/1987 |
| FR | 2228663 | | 12/1974 |
| FR | 2768996 A1 | | 4/1999 |
| FR | 2768997 A1 | | 4/1999 |
| FR | 2848524 A1 | | 6/2004 |

OTHER PUBLICATIONS

Search Report and Written Opinion; Application No. FR 09 05111; dated Jun. 4, 2010.

* cited by examiner

*Primary Examiner* — Edward Look
*Assistant Examiner* — Jesse Prager
(74) *Attorney, Agent, or Firm* — Brooks Kushman P.C.

(57) ABSTRACT

A set (10) of cyclic swashplates (11, 12) for controlling the pitch of blades (4) of a main rotor (1) of a rotorcraft. The set includes a non-rotary swashplate (12) retained against rotation about an axis of rotation (AX) and a rotary swashplate (11) suitable for rotating about the axis of rotation (AX). The set (10) also includes drive means (100) with a drive arm (101) and an annular linear connection means (200) secured to the rotary swashplate (11). A first end (110) of the drive arm (101) is connected to the rotary swashplate (11) by the annular linear connection means (200). A second end (120) of the drive arm (101) is connected to a rotor mast (2) by slideway connection means (300) of the drive means (100).

20 Claims, 2 Drawing Sheets

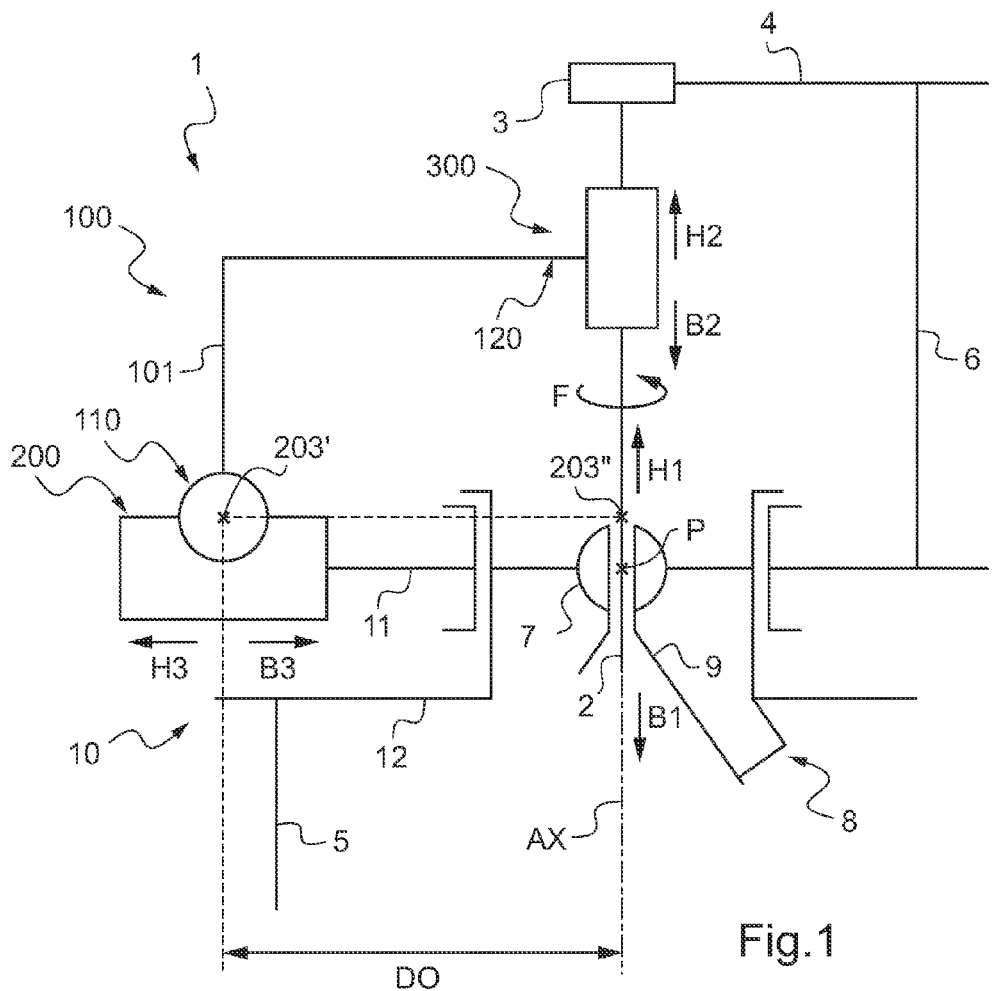
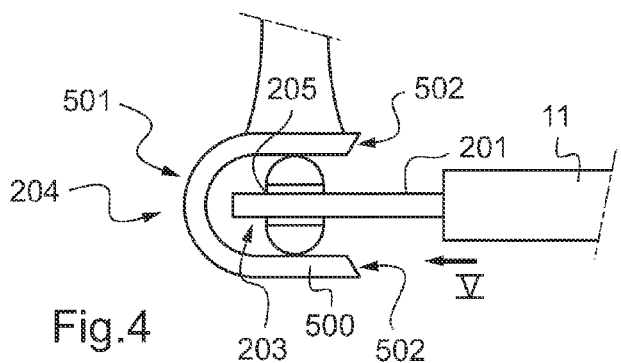
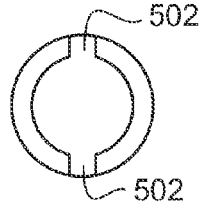

of the blades of the main rotor, and to a rotor provided with such a set.

SET OF CYCLIC SWASHPLATES FOR CONTROLLING THE PITCH OF BLADES OF A MAIN ROTOR, AND A ROTOR PROVIDED WITH SUCH A SET

CROSS REFERENCE TO RELATED APPLICATION

This application claims the benefit of application no. FR 09 05111 filed Oct. 23, 2009, the disclosure of which is incorporated herein by reference.

FIELD OF THE INVENTION

The present invention relates to a set of cyclic swashplates for controlling the pitch of blades of a main rotor, and to a rotor provided with such a set.

BACKGROUND OF THE INVENTION

The main rotor of a rotorcraft serves to provide rotorcraft with lift, and indeed with propulsion. Conventionally, such a main rotor driven by an appropriate power plant comprises a rotor mast that sets a plurality of blades into rotation by means of a rotor hub.

In order to control the movement of the rotorcraft, the pitch of the blades of the main rotor is controlled, i.e. their angle of aerodynamic incidence is controlled. Under such circumstances, the blade pitch is adjustable by means of pitch control rods and a set of cyclic swashplates surrounding the rotor mast, the cyclic swashplates comprising in principle a rotary swashplate connected to the pitch control rods and a non-rotary swashplate connected to the flight controls.

The non-rotary swashplate is usually situated beneath the rotary swashplate and it imparts its movements along the axis of rotation of the rotor to the rotary swashplate. Thus, the rotary swashplate follows all of the movements of the non-rotary swashplate and transmits those movements to the blades via the pitch control rods.

Consequently, e.g. by using a plurality of servo-controls connected to the structure of the rotorcraft and to the non-rotary swashplate, the non-rotary and rotary swashplates are in a position to be moved in translation along the axis of rotation of the rotor mast, and also to be tilted relative to the rotor mast. Usually, movements in translation and in tilting are delivered using a device having a mast ball joint centered on the axis of rotation of the rotor and slidable along a stationary structural element that surrounds the rotor mast.

The non-rotary swashplate is then mounted in oscillating manner on the mast ball joint so as to be capable of being tilted and moved in translation relative to the rotor mast. In addition, the non-rotary swashplate is secured to the structure of the rotorcraft via at least one stationary scissors link that consequently prevents it from turning about the axis of rotation of the rotor.

The rotary swashplate of the set of cyclic swashplates is then connected to the non-rotary swashplate by a member enabling:

the rotary swashplate to be secured to the non-rotary swashplate in translation along the axis of rotation of the rotor;

the rotary swashplate to tilt about the mast ball joint jointly with the non-rotary swashplate; and the rotary swashplate to rotate about the axis of rotation jointly with the rotor.

To this end, the rotary swashplate is provided with at least one rotary scissors link connected to the rotor mast, possibly by the hub of the main rotor, the mast rotor driving rotation of the rotary swashplate about the axis of rotation.

A scissors link, whether rotary or non-rotary, generally comprises two hinged arms. More precisely, each scissors link comprises a primary arm and a secondary arm that are hinged to each other by a first hinge, the primary arm being connected via a second hinge to the rotor mast or to the structure, as appropriate, while the secondary arm is connected to the rotary swashplate by a third hinge.

Although effective, it is found that the first, second, and third hinges are subjected to high levels of wear requiring expensive and repeated maintenance actions.

To remedy that, scissors links are often overdimensioned, and thus end up being heavy and expensive to fabricate.

In addition, scissors links occupy a large amount of space, given the movements they must be free to make.

Document FR 2 768 996 thus seeks to replace the rotary scissors link by means that are lightweight, that are inexpensive to fabricate, and that generate less aerodynamic drag.

The set of cyclic swashplates then includes drive means constituting an alternative to the rotary scissors link and provided with two diametrically rigid arms, each rigid arm being firstly secured to the rotor mast and secondly connected by point connection means to the rotary swashplate.

More precisely, each arm is provided with a U-shaped section defining a rigid drive track in which there is received a finger of the rotary swashplate. The combination of the finger and the rigid track then constitutes point connection means.

It should be observed that in order to co-operate with the rigid drive track, in different variants the finger has one wheel, a pair of wheels, a sliding shoe, or indeed a sliding shoe and a wheel.

The solution of document FR 2 768 996 is advantageous.

Nevertheless, the space occupied by that solution continues to be considerable. In addition, there is a risk of frost forming on the rigid drive tracks and that can disturb the operation of the point connection means.

SUMMARY OF THE INVENTION

The present invention therefore seeks to provide a set of cyclic swashplates provided with drive means that are inexpensive and robust.

According to the invention, a set of cyclic swashplates for controlling the pitch of blades of a main rotor of a rotorcraft has a non-rotary swashplate retained against any rotation about an axis of rotation and a rotary swashplate suitable for rotating about the axis of rotation.

This set of cyclic swashplates is remarkable in particular in that the set includes drive means suitable for connecting the rotary swashplate and a rotor mast of the main rotor in rotation about the axis of rotation, and the drive means are provided with a drive arm and annular linear connection means secured to the rotary swashplate in rotation about the axis of rotation, a first end of the drive arm being connected to the rotary swashplate by the annular linear connection means, and a second end of the drive arm being suitable for being connected to a rotor mast by slideway connection means of the drive means.

Thus, the non-rotary swashplate is not driven in rotation by a scissors link but rather by a single drive arm, i.e. a slide that is connected to a rotor mast and to the rotary swashplate respectively via a slideway connection and via an annular linear connection of operation that can be made to be entirely predictable.

It should be observed that such slideways and annular linear connections are not comparable in any way to a point connection of the type implemented by document FR 2 768 996. Reference can be made to document FR 2 228 663, which describes a connection comprising a ball joint at the end of an arm of a rotorcraft rotor hub.

Thus, once arranged on a rotor mast, the second end of the drive arm is capable of sliding along the axis of rotation of the rotor on the rotor mast via the slideway connection means, while the first end of the drive arm moves radially relative to the rotary swashplate via the annular linear connection means.

The invention thus provides a single drive arm suitable for being connected to the rotor mast and to the rotary swashplate by connections that are robust and well-proven.

The invention optionally includes one or more of the following additional characteristics.

For example, the slideway connection means comprise first fluting secured to the second end of the drive arm and suitable for co-operating with second fluting of the rotor mast, the first fluting being arranged at a periphery of a through orifice formed in the second end of the drive arm, the first fluting being disposed in a direction parallel to the axis of rotation.

Thus, the second end of the drive arm surrounds the rotor mast. In addition, the first fluting and the second fluting constrain the drive arm to rotate with the rotor mast about the axis of rotation, while also allowing the drive arm to slide along the rotor mast.

Under such circumstances, the drive arm constitutes a driving slide, given its ability to slide along the rotor mast.

In a first variant, the first fluting may be obtained by machining the second end of the drive arm for this purpose.

Nevertheless, in a second variant, the slideway connection means advantageously include a ring provided with the first fluting, the ring being inserted in the second end of the drive arm to define the orifice that is to receive the rotor mast.

By way of example, the ring may be manufactured using an aluminum alloy, with nitriding surface treatment optionally being applied to the ring.

Consequently, the second end of the drive arm is drilled and the ring is arranged in the resulting drilled hole. By way of example, the ring is inserted as a force-fit in the hole at the second end in order to secure the ring to the drive arm.

Furthermore, the annular linear connection means may comprise a ball joint and a fastener pin, the ball joint being secured to the first end of the drive arm, the fastener pin being secured to the rotary swashplate and passing through the ball joint.

The ball joint is then arranged in an outer cage that is inserted in the first end, with the ball joint being free to revolve inside the outer cage. In addition, the ball joint includes an inner cage with the fastener pin passing therethrough. Thus, the ball joint is capable of sliding along the fastener pin and allows the fastener pin to be tilted relative to the drive arm.

Advantageously, the fastener pin is arranged in the plane of the rotary swashplate. The fastener pin is directed towards the axis of rotation of the rotary swashplate, with its axis then intersecting the axis of rotation.

Optionally, the rotary swashplate includes a slot in which the fastener pin is arranged.

Furthermore, since the annular linear connection means include a ball joint, a center of the ball joint lies at a first distance from the axis of rotation of the rotor. This first distance is made to be small so as to limit the jamming effect of the drive arm relative to its fluting and so as to reduce the movements in the slideways and annular connection means.

This results in a reduction in the forces exerted on the means for driving the rotary swashplate in rotation, and thus on the drive arm, on the slideway connection means, and on the annular linear connection means of the drive means.

In addition to a set of cyclic swashplates, the invention also provides a rotorcraft rotor.

Thus, according to the invention, a rotorcraft rotor is provided with a rotor mast driving a plurality of blades in rotation about an axis of rotation, the rotor including a set of cyclic swashplates for controlling the pitch of the blades and provided with a non-rotary swashplate retained against rotation about the axis of rotation and with a rotary swashplate suitable for rotating about the axis of rotation, the set of cyclic swashplates including drive means connecting the rotary swashplate and the rotor mast in rotation about the axis of rotation.

This rotor is remarkable in particular in that the set of cyclic swashplates is as described above, and the drive means is provided with a drive arm and with annular linear connection means secured to the rotary swashplate, a first end of the drive arm being connected to the rotary swashplate by the annular linear connection means, and a second end of the drive arm being connected to the rotor mast by slideway connection means of the drive means.

In addition, the rotor mast passes through an orifice in the second end of the drive arm, and the slideway connection means optionally comprise first fluting located at the second end of the drive arm, the first fluting being arranged at a periphery of a through orifice formed in the second end of the drive arm to co-operate with second fluting of the rotor mast, the first fluting and the second fluting being disposed in a direction parallel to the axis of rotation.

BRIEF DESCRIPTION OF THE DRAWINGS

The invention and its advantages appear in greater detail from the following description of embodiments given by way of illustration with reference to the accompanying figures, in which:

FIG. 1 is a schematic view of one embodiment of the invention;

FIGS. 4 and 5 depict a variant of an annular linear connection means.

Figure 2:
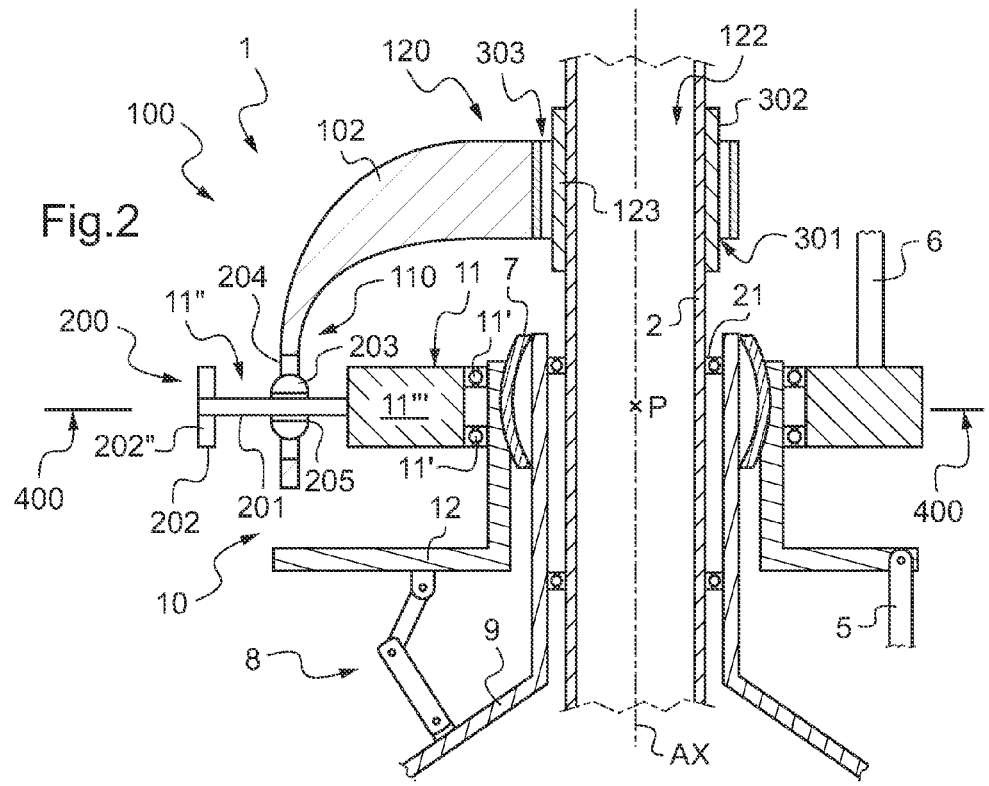
FIG. 2 is a cross section of a first variant embodiment of the invention.

Elements present in more than one of the figures are given the same references in each of them.

DETAILED DESCRIPTION OF THE PREFERRED EMBODIMENT

FIG. 1 depicts a rotor 1 provided with a rotor mast 2 for driving a plurality of blades 4 in rotation about an axis of rotation AX, each blade 4 being fastened to the rotor mast 2 by a common hub 3.

Since the rotor 1 is a main lift and propulsion rotor of a rotorcraft, it is provided with a set 10 of swashplates connected to the flight controls by servo-controls 5.

More precisely, the swashplate assembly 10 comprises a non-rotating plate 12 arranged on a ball joint 7 of the mast 2 that is mounted to slide on an element 9 of the rotorcraft. In addition, the non-rotary swashplate 12 is connected to the element 9 by a non-rotary scissors link which retains the non-rotary swashplate against any rotation about the axis of rotation AX.

Other means for retaining the non-rotary swashplate relative to the element 9 can be envisaged without going beyond the ambit of the invention. For example, it is possible to implement the retaining means described in document FR 2 768 997, which is incorporated herein by reference.

The swashplate assembly 10 also includes a rotary swashplate 11 fastened to the non-rotary swashplate 12 by a fastening that nevertheless allows the rotary swashplate 11 to move in rotation about the axis AX relative to the non-rotary swashplate 12. The rotary and non-rotary swashplates 11 and 12 share a common axis.

Under such circumstances, the non-rotary swashplate 12 is connected to the flight controls by servo-controls 5, while the rotary swashplate is connected to each blade via a respective pitch control rod 6.

When the flight controls require collective pitch variation, the servo-controls act on the non-rotary swashplate 12 so as to move both the non-rotary swashplate 12 and the rotary swashplate 11 jointly along the axis of rotation AX. However, if the pitch controls require cyclic pitch variation, then the non-rotary and rotary swashplates 12 and 11 are tilted jointly about a point P corresponding to the center of the mast ball joint 7.

Furthermore, in order to be able to rotate about the axis of rotation AX, the swashplate assembly 10 includes drive means 100 connecting the rotary swashplate 11 to the rotor mast 2.

Reference may be made to the literature to obtain more information about the arrangement and the operation of the non-rotary swashplate 12 and the rotary swashplate 11 of a cyclic swashplate set 10. Reference may also be made to document FR 2 848 524, which is incorporated herein by reference and which describes a connection between the rotary swashplate and the non-rotary swashplate.

According to one embodiment of the invention, the drive means 100 include a drive arm 101.

A first end 110 of this drive arm 101 is connected to the rotary swashplate 11 by annular linear connection means 200, while a second end 120 of the drive arm 101 is connected to the rotor mast 2 by a slideway connection 300.

It should be noted that the annular linear connection means 200 comprise a ball joint having its center 203' situated at a first distance D0 from the axis of rotation AX. More precisely the first distance D0 is equal to the distance between the center 203' of the ball joint and the orthogonal projection 203" of the center 203' of the ball joint onto the axis of rotation AX.

Under such circumstances, the rotor mast 2 drives the drive arm 101 in rotation about the axis of rotation AX, and consequently drives the rotary swashplate 11.

Furthermore, the drive arm 101 does not impede the system for controlling the pitch of the blades 4.

When the servo-controls 5 require the non-rotary and rotary swashplates 12 and 11 to move in translation upwards along arrow H1, the slideway connection means 300 allow the drive arm 101 to slide upwards along the rotor mast 2 along arrow H2. Furthermore, if the rotary swashplate 11 presents an angle relative to the axis of rotation AX other than 90 degrees, then the annular linear connection means 200 allow the first end 110 of the drive arm 101 to move radially towards the outside of the rotary swashplate 11 along arrow H3 so that the first distance D0 remains constant.

Conversely, when the servo-controls 5 require the non-rotary and rotary swashplates 12 and 11 to move in translation downwards along arrow B1, the slideway connection means 300 allow the drive arm 101 to slide on the rotor mast 2 downwards along arrow B2. Furthermore, if the rotary swashplate presents an angle relative to the axis of rotation AX other than 90 degrees, and thus an angle relative to the mid-position shown in FIG. 1 in which the rotary swashplate is orthogonal to the axis of rotation AX, then the annular linear connection means 200 allow the first end 110 of the drive arm 101 to move radially towards the outside of the rotary swashplate 11 along arrow H3.

It should be observed that when the pilot requires the rotary swashplate to rock in order to return towards its mid-position, then the annular linear connection means 200 allow the first end 110 of the drive arm 101 to move radially towards the inside of the rotary swashplate 11 along arrow B3.

Furthermore, if the servo-controls the non-rotary swashplate 12 and the rotary swashplate 11 to tilt about the center P of the mast ball joint 7, then the annular linear connection means 200 allow the rotary swashplate 11 to tilt relative to the first end 110 of the drive arm 101. In addition, the slideway connection means 300 allow the second end 120 of the drive arm 101 to slide along the rotor mast 2.

FIG. 2 is a section view of a first variant of the invention.

It can be seen that the rotor mast 2 passes through a structural element 9 of the rotorcraft with bearings 21 being disposed between the rotor mast 2 and the element 9.

In addition, FIG. 2 shows ball bearings 11' between the body 11''' of the rotary swashplate 11 and non-rotary swashplate 12, so as to allow the rotary swashplate 11 to rotate about the axis of rotation AX of the rotor 1.

Furthermore, the rotary swashplate 11 includes a slot 11" into which the first end 110 of the arm 100 penetrates. This slot 11" may be obtained using a U-shaped fork 202 having two side branches 202' secured to a common end 202", the side branches 202' being secured to the body 11''' of the rotary swashplate 11 and being shown in FIG. 3.

It should be observed that the slot 11" may be formed in the body 11''' of the rotary swashplate 11.

The annular link means 200 of the drive means 100 is consequently provided with a fastener pin 201 partially obstructing the slots 11", this fastener pin 201 extending across the slot 11 from the common end 202" of the fork 202 towards the body 11''' of the rotary swashplate.

In addition, the fastener pin 201 is parallel to the side branches 202, the fastener pin 201 being arranged in the plane 400 that contains the rotary swashplate 11. The axis of the fastener pin 201 then advantageously intersects the axis of rotation AX, the axis of the fastener pin 201 being perpendicular to the axis of rotation AX when the plane 400 of the rotary swashplate 11 is perpendicular to the axis of rotation AX.

In addition to the fastener pin 201, the annular linear connection means 200 possess a ball joint 203 arranged in an outer cage 204, the outer cage 204 being, for example, inserted by force in the first end 110 of the drive arm 101.

Consequently, the fastener pin 201 passes through an inner cage 205 of the ball joint 203, with the ball joint 203 being capable of sliding along the fastener pin 201.

Furthermore, the second end 120 of the drive arm 101 of the drive means 100 includes an orifice 122, the orifice 122 passing through the second end 120. The drive arm 101 is then engaged around the rotor mast 2 with the second end 120 of the drive arm 101 surrounding the rotor mast 2.

The slideway connection means 300 advantageously possess first fluting 301 formed at the periphery 123 of the orifice 122.

In the first variant shown in FIG. 2, the slideway connection means 300 have a ring 303 with the internal periphery 123 thereof including the first fluting and defining the orifice 122. The ring 303 is inserted in the second end 120 of the drive arm 101 by conventional methods, e.g. being inserted by force.

Figure 3:
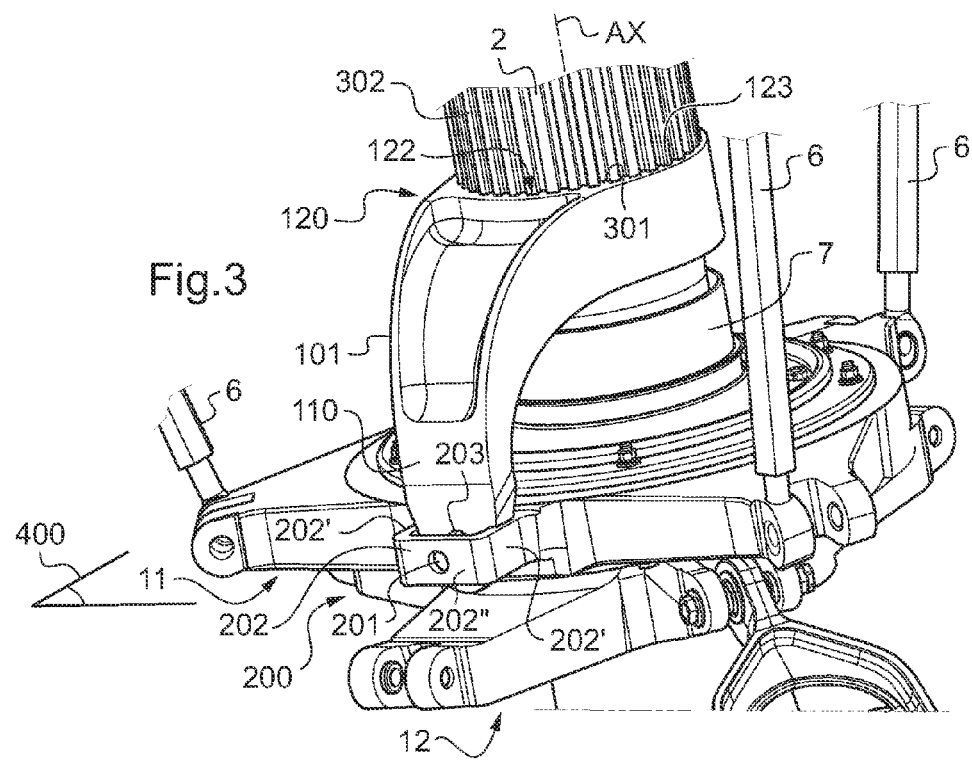
FIG. 3 is an isometric view of a second variant thereof.

In the second variant shown in FIG. 3, the second end 120 is machined to present the first fluting 301 and the orifice 122. For example, the second end 120 is drilled to make the orifice 122, and then the grooves are machined in the periphery of the orifice 122 to create the first fluting 301.

Thus, in the second variant, the first fluting of the drive arm 101 is obtained by machining the second end 120 of the drive arm 101, whereas in the first variant, the first fluting is the result of inserting a fluted ring 320 in the second end 120.

Regardless of the variant, the first fluting extends in a direction parallel to the axis of rotation AX.

In addition, with reference to FIGS. 2 and 3, the rotor mast 2 has second fluting 302 extending in a direction parallel to the axis of rotation AX.

Under such circumstances, when the drive arm 101 is engaged on the rotor mast 2, the first fluting 301 co-operates with the second fluting 302. Thus, the second fluting 302 meshes with the first fluting to rotate about the axis of rotation AX while allowing the first fluting to slide along the rotor mast 2.

In order to facilitate sliding of the first fluting 301, the length of the second fluting 302 is preferably longer than the length of the first fluting 301, the first fluting 301 then continuing to mesh with the second fluting 302 regardless of the vertical position of the second end 120, i.e. regardless of the sliding performed by the second end 120 along the rotor mast 2.

In addition, FIGS. 4 and 5 are diagrammatic views of a variant of the annular linear connection means.

In this variant, instead of providing an annular type outer cage inserted in the first end 110 of the drive arm 101, the outer cage 204 is in the form of a receptacle receiving the ball joint 203 and suitable for co-operating with a fastener pin 201 secured to the rotary swashplate 11.

For example, the outer cage 204 has a cylindrical tunnel 500 fastened to the first end 110 of the drive arm 100, possibly by welding. The first base of the cylindrical tunnel remote from the rotary swashplate 11 is closed by an end wall 501, while the second base of the cylindrical tunnel facing the rotary swashplate 11 remains open.

Under such circumstances, the fastener pin 201 penetrates into the cylindrical tunnel 500 and extends across the inner cage 205 of the ball joint 203.

In addition, the cylindrical tunnel is advantageously provided with two recesses 502 formed in the second base of the cylindrical tunnel 500 in order to facilitate tilting of the cylindrical tunnel 500 relative to the fastener pin 201.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

For example, it is possible to envisage implementing not merely one arm but rather a plurality of drive arms associated with annular and slideway connection means.

What is claimed is:

1. A set of cyclic swashplates for controlling the pitch of blades of a main rotor of a rotorcraft having flight controls, the set having:
   a non-rotary swashplate connected to the flight controls, the non-rotary swashplate being retained against rotation about an axis of rotation (AX),
   a rotary swashplate fastened to each blade and the non-rotary swashplate so that the rotary swashplate may rotate about the axis of rotation (AX) relative to the non-rotary swashplate,
   drive means that connect the rotary swashplate and a rotor mast of the main rotor in rotation about the axis of rotation (AX),
   a drive arm with slideway connection means and
   annular linear connection means secured to the rotary swashplate in rotation about the axis of rotation (AX),
      a first end of the drive arm being connected to the rotary swashplate by the annular linear connection means, and
      a second end of the drive arm being connected to the rotor mast by the slideway connection means associated with the drive means, wherein the slideway connection means comprise first fluting secured to the second end of the drive arm and co-operating with second fluting of the rotor mast, the first fluting being arranged at a periphery of a through orifice formed in the second end of the drive arm, the first fluting being disposed in a direction parallel to the axis of rotation (AX).

2. The set of cyclic swashplates according to claim 1, wherein the slideway connection means include a ring provided with the first fluting, the ring being inserted in the second end of the drive arm to define the orifice.

3. The set of cyclic swashplates according to claim 1, wherein the annular linear connection means comprise a ball joint and a fastener pin, the ball joint being secured to the first end, the fastener pin being secured to the rotary swashplate and passing through the ball joint.

4. The set of cyclic swashplates according to claim 3, wherein the ball joint is arranged in an outer cage, the outer cage being inserted in the first end of the drive arm, the ball joint being adapted to revolve inside the outer cage.

5. The set of cyclic swashplates according to claim 3, wherein the ball joint includes an inner cage through which the fastener pin passes for sliding along the fastener pin.

6. The set of cyclic swashplates according to claim 3, wherein the fastener pin is directed towards the axis of rotation (AX).

7. The set of cyclic swashplates according to claim 3, wherein the rotary swashplate includes a slot that receives the fastener pin.

8. A rotor of a rotorcraft with a rotor mast driving a plurality of blades in rotation about an axis of rotation (AX), the rotor including:
   a set of cyclic swashplates for controlling the pitch of the blades, the set comprising
      a non-rotary swashplate retained against rotation about the axis of rotation (AX),
      a rotary swashplate that rotates about the axis of rotation (AX), and
      drive means connecting the rotary swashplate and the rotor mast in rotation about the axis of rotation (AX), the drive means having
   a drive arm with annular linear connection means secured to the rotary swashplate,
      a first end of the drive arm connected to the rotary swashplate by annular linear connection means, and
      a second end of the drive arm connected to the rotor mast by slideway connection means associated with the drive means, wherein the rotor mast passes through an orifice in the second end of the drive arm and the slideway connection means comprise first fluting located at the second end of the drive arm, the first fluting being arranged at a periphery of a through orifice formed in the second end of the drive arm to co-operate with second fluting of the rotor mast, the first and second fluting being disposed in a direction parallel to the axis of rotation (AX).

9. A set of cyclic swashplates for controlling the pitch of blades of a main rotor of a rotorcraft having flight controls, the set having:
a non-rotary swashplate connected to the flight controls, the non-rotary swashplate being retained against rotation about an axis of rotation (AX),
a rotary swashplate fastened to each blade and the non-rotary swashplate so that the rotary swashplate may rotate about the axis of rotation (AX) relative to the non-rotary swashplate,
drive means that connect the rotary swashplate and a rotor mast of the main rotor in rotation about the axis of rotation (AX),
a drive arm with slideway connection means and
annular linear connection means secured to the rotary swashplate in rotation about the axis of rotation (AX),
a first end of the drive arm being connected to the rotary swashplate by the annular linear connection means, and
a second end of the drive arm being connected to the rotor mast by the slideway connection means associated with the drive means, wherein the annular linear connection means comprise a ball joint and a fastener pin, the ball joint being secured to the first end, the fastener pin being secured to the rotary swashplate and passing through the ball joint.

10. The set of cyclic swashplates according to claim 9, wherein the slideway connection means comprise first fluting secured to the second end of the drive arm and co-operating with second fluting of the rotor mast, the first fluting being arranged at a periphery of a through orifice formed in the second end of the drive arm, the first fluting being disposed in a direction parallel to the axis of rotation (AX).

11. The set of cyclic swashplates according to claim 10, wherein the slideway connection means include a ring provided with the first fluting, the ring being inserted in the second end of the drive arm to define the orifice.

12. The set of cyclic swashplates according to claim 9, wherein the ball joint is arranged in an outer cage, the outer cage being inserted in the first end of the drive arm, the ball joint being adapted to revolve inside the outer cage.

13. The set of cyclic swashplates according to claim 9, wherein the ball joint includes an inner cage through which the fastener pin passes for sliding along the fastener pin.

14. The set of cyclic swashplates according to claim 9, wherein the fastener pin is directed towards the axis of rotation (AX).

15. The set of cyclic swashplates according to claim 9, wherein the rotary swashplate includes a slot that receives the fastener pin.

16. The rotor according to claim 8, wherein the slideway connection means comprise first fluting secured to the second end of the drive arm and co-operating with second fluting of the rotor mast, the first fluting being arranged at a periphery of a through orifice formed in the second end of the drive arm, the first fluting being disposed in a direction parallel to the axis of rotation (AX).

17. The rotor according to claim 16, wherein the slideway connection means include a ring provided with the first fluting, the ring being inserted in the second end of the drive arm to define the orifice.

18. The rotor according to claim 8, wherein the annular linear connection means comprise a ball joint and a fastener pin, the ball joint being secured to the first end, the fastener pin being secured to the rotary swashplate and passing through the ball joint.

19. The rotor according to claim 18, wherein the ball joint is arranged in an outer cage, the outer cage being inserted in the first end of the drive arm, the ball joint being adapted to revolve inside the outer cage.

20. The rotor according to claim 18, wherein the ball joint includes an inner cage through which the fastener pin passes for sliding along the fastener pin.

* * * * *